US012766467B2

(12) United States Patent
Miyahara et al.

(10) Patent No.: US 12,766,467 B2
(45) Date of Patent: Oct. 20, 2026

(54) ZEOLITE MEMBRANE COMPLEX AND METHOD OF PRODUCING ZEOLITE MEMBRANE COMPLEX

(71) Applicant: NGK INSULATORS, LTD., Nagoya-City (JP)

(72) Inventors: Makoto Miyahara, Tajimi City (JP); Kenichi Noda, Nagoya-City (JP); Naoto Kinoshita, Nagoya-City (JP)

(73) Assignee: NGK INSULATORS, LTD., Nagoya-City (JP)

( * ) Notice: Subject to any disclaimer, the term of this patent is extended or adjusted under 35 U.S.C. 154(b) by 470 days.

(21) Appl. No.: 18/342,851

(22) Filed: Jun. 28, 2023

(65) Prior Publication Data

US 2023/0338900 A1 Oct. 26, 2023

Related U.S. Application Data

(63) Continuation of application No. PCT/JP2022/004697, filed on Feb. 7, 2022.

(30) Foreign Application Priority Data

Feb. 10, 2021 (JP) ................................ 2021-019722

(51) Int. Cl.
*B01D 67/00* (2006.01)
*B01D 69/02* (2006.01)
(Continued)

(52) U.S. Cl.
CPC ......... *B01D 67/0051* (2013.01); *B01D 69/02* (2013.01); *B01D 69/106* (2022.08);
(Continued)

(58) Field of Classification Search
CPC ............ B01D 2323/06; B01D 2325/04; B01D 67/0051; B01D 69/02; B01D 69/106;
(Continued)

(56) References Cited

U.S. PATENT DOCUMENTS

2019/0292062 A1 9/2019 Yoshimura et al.
2020/0114307 A1 4/2020 Tanaka et al.

FOREIGN PATENT DOCUMENTS

JP 2018130719 A * 8/2018
JP 2019-167289 A 10/2019
(Continued)

OTHER PUBLICATIONS

Chinese Office Action (with English translation) dated Jul. 26, 2025 (Application No. 202280008122.8).
(Continued)

*Primary Examiner* — Latosha Hines
(74) *Attorney, Agent, or Firm* — Muncy, Geissler, Olds & Lowe, P.C.

(57) ABSTRACT

A zeolite membrane complex includes a porous support and a zeolite membrane provided on the support and composed of RHO-type zeolite. In a case where a surface of the zeolite membrane is measured by an X-ray diffraction method, a peak intensity derived from a (310) plane of RHO-type zeolite is not higher than 0.4 times a peak intensity derived from a (110) plane thereof and a peak intensity derived from a (211) plane thereof is not higher than 0.3 times the peak intensity derived from the (110) plane.

6 Claims, 4 Drawing Sheets

(51) Int. Cl.

| | |
|---|---|
| ***B01D 69/10*** | (2006.01) |
| ***B01D 69/12*** | (2006.01) |
| ***B01D 71/02*** | (2006.01) |
| ***B01J 20/18*** | (2006.01) |
| ***B01J 20/28*** | (2006.01) |
| ***B01J 20/32*** | (2006.01) |

(52) U.S. Cl.
CPC ..... *B01D 69/1218* (2022.08); *B01D 71/0281* (2022.08); *B01J 20/18* (2013.01); *B01J 20/28004* (2013.01); *B01J 20/28035* (2013.01); *B01J 20/3238* (2013.01); *B01J 20/3297* (2013.01); *B01D 2323/06* (2013.01); *B01D 2325/04* (2013.01)

(58) Field of Classification Search
CPC .. B01D 69/1218; B01D 71/0281; B01J 20/18; B01J 20/28004; B01J 20/28035; B01J 20/3238; B01J 20/3297
See application file for complete search history.

(56) References Cited

FOREIGN PATENT DOCUMENTS

| | | | |
|---|---|---|---|
| JP | 2020-066564 | A | 4/2020 |
| WO | 2018/230737 | A1 | 12/2018 |

OTHER PUBLICATIONS

Bo Liu, "Preparation of Rho Zeolite Membranes on Tubular Supports," *Membrane*, 2016 41 (2), pp. 81-86 (6 pages).
International Search Report and Written Opinion (Application No. PCT/JP2022/004697) dated Mar. 15, 2022 (8 pages).
English translation of the International Preliminary Report on Patentability (Chapter I) dated Aug. 24, 2023 (Application No. PCT/JP2022/004697).
Japanese Office Action (Application No. 2022-580618) dated Aug. 29, 2024 (with English translation) (8 pages).

* cited by examiner

ZEOLITE MEMBRANE COMPLEX AND METHOD OF PRODUCING ZEOLITE MEMBRANE COMPLEX

CROSS-REFERENCE TO RELATED APPLICATIONS

The present application is a continuation application of International Application No. PCT/JP2022/4697 filed on Feb. 7, 2022, which claims priority to Japanese Patent Application No. 2021-19722 filed on Feb. 10, 2021. The contents of these applications are incorporated herein by reference in their entirety.

TECHNICAL FIELD

The present invention relates to a zeolite membrane complex and a method of producing a zeolite membrane complex.

BACKGROUND ART

In Japanese Patent Application Laid Open Gazette No. 2018-130719 (Document 1), disclosed is an RHO-type zeolite membrane formed on a porous support by using an organic structure-directing agent. In an X-ray diffraction pattern obtained by emitting an X-ray to a surface of the zeolite membrane, the peak intensity in the vicinity of $2\theta=18.7°$ is not lower than 1.0 times the peak intensity in the vicinity of $2\theta=8.3°$, and the peak intensity in the vicinity of $2\theta=14.4°$ is not lower than 0.5 times the peak intensity in the vicinity of $2\theta=8.3°$. Therefore, in the zeolite membrane in Document 1, zeolite crystals are oriented and grown so that a (310) plane and a (211) plane should be oriented nearly parallel to the membrane surface. Further, in "Preparation of Rho Zeolite Membranes on Tubular Supports" by Bo Liu and other four, (MEMBRANE, 2016, vol. 41, No. 2, pp. 81 to 86) (Document 2), disclosed is a method of forming an RHO-type zeolite membrane on a porous support without using the organic structure-directing agent.

In order to obtain a zeolite membrane complex having high separation performance, a dense zeolite membrane is needed. Since a starting material solution used for forming, for example, an aluminosilicate type RHO zeolite membrane has low fluidity, however, it is easy to generate a clearance in a grain boundary and difficult to form a dense thin film. In Document 1, the denseness of the zeolite membrane is increased by repeating hydrothermal synthesis a plurality of times, but a production cost of the zeolite membrane complex disadvantageously increases. In Document 2, though a dense membrane can be obtained by performing the hydrothermal synthesis for six days, also in this case, the production cost of the zeolite membrane complex disadvantageously increases. Further, in Document 2, the thickness of the zeolite membrane is about 2 μm, but the water permeance (water flux) has a low value, i.e., not higher than 1 $kg/m^2$ h. In the zeolite membrane complex, not only high separation performance but also high permeance is required.

SUMMARY OF THE INVENTION

The present invention is intended for a zeolite membrane complex, and it is an object of the present invention to easily provide a zeolite membrane complex which has a zeolite membrane composed of RHO-type zeolite and achieves high separation performance and high permeance.

The zeolite membrane complex according to one preferred embodiment of the present invention includes a porous support and a zeolite membrane provided on the support and composed of RHO-type zeolite. In the zeolite membrane complex of the present invention, in a case where a surface of the zeolite membrane is measured by an X-ray diffraction method, a peak intensity derived from a (310) plane of RHO-type zeolite is not higher than 0.4 times a peak intensity derived from a (110) plane thereof and a peak intensity derived from a (211) plane thereof is not higher than 0.3 times the peak intensity derived from the (110) plane.

According to the present invention, it is possible to easily provide a zeolite membrane complex which has a zeolite membrane composed of RHO-type zeolite and achieves high separation performance and high permeance.

Preferably, a composite layer is provided in the support, with part of the zeolite membrane entering pores, and a thickness of the composite layer is smaller than that of the zeolite membrane on the support.

Preferably, the thickness of the zeolite membrane is not larger than 5 μm and the thickness of the composite layer is not larger than 1 μm.

Preferably, in the zeolite membrane, a molar ratio of silicon/aluminum is 1 to 10.

The present invention is also intended for a method of producing a zeolite membrane complex.

The method of producing a zeolite membrane complex according to one preferred embodiment of the present invention includes a) depositing seed crystals composed of RHO-type zeolite, onto a porous support, and b) forming a zeolite membrane on the support by immersing the support in a starting material solution and performing hydrothermal synthesis to grow RHO-type zeolite from the seed crystals. In the method of producing a zeolite membrane complex of the present invention, in the starting material solution, a molar ratio of silicon/aluminum is 2 to 20, a molar ratio of sodium/aluminum is 10 to 100, a molar ratio of cesium/aluminum is 0.5 to 10, and a molar ratio of water/aluminum is 500 to 5000.

Preferably, a viscosity of the starting material solution at 20° C. is 1 to 150 mPa·s.

These and other objects, features, aspects and advantages of the present invention will become more apparent from the following detailed description of the present invention when taken in conjunction with the accompanying drawings.

DETAILED DESCRIPTION

Figure 1:
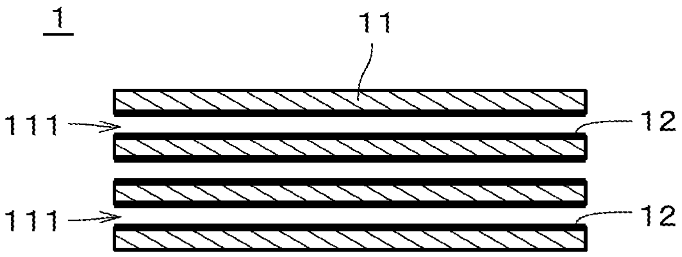
FIG. 1 is a cross-sectional view of a zeolite membrane complex.
Figure 2:
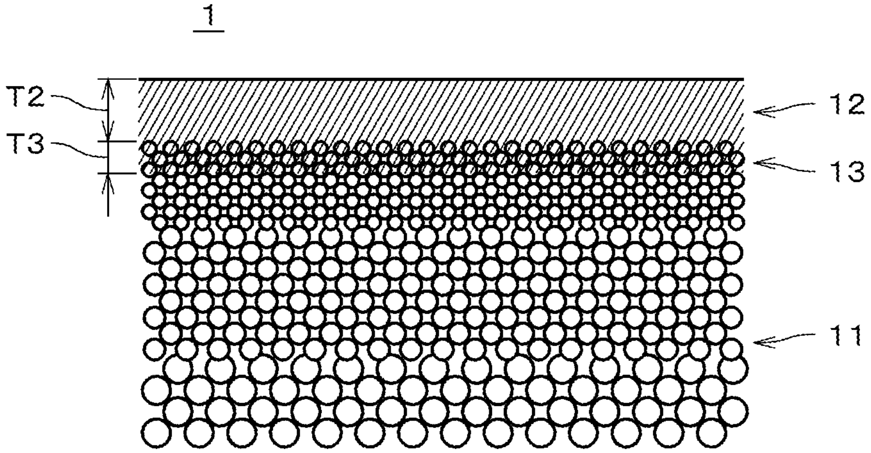
FIG. 2 is a cross-sectional view enlargedly showing part of the zeolite membrane complex.

FIG. 1 is a cross-sectional view showing a zeolite membrane complex 1, and FIG. 2 is a cross-sectional view enlargedly showing part of the zeolite membrane complex 1. The zeolite membrane complex 1 includes a porous support 11 and a zeolite membrane 12 provided on the support 11. A zeolite membrane is at least obtained by forming zeolite on a surface of the support 11 in a membrane form and does not include a membrane obtained by simply dispersing zeolite particles in an organic membrane. In FIG. 1, the zeolite membrane 12 is represented by a thick line. In FIG. 2, the zeolite membrane 12 and a composite layer 13 described later are hatched. Further, in FIG. 2, the respective thicknesses of the zeolite membrane 12 and the composite layer 13 are shown larger than the actual ones.

The support 11 is a porous member that gas and liquid can permeate. In the exemplary case shown in FIG. 1, the support 11 is a monolith-type support having an integrally and continuously molded columnar main body provided with a plurality of through holes 111 extending in a longitudinal direction (i.e., a left and right direction in FIG. 1). In the exemplary case shown in FIG. 1, the support 11 has a substantially columnar shape. A cross section perpendicular to the longitudinal direction of each of the through holes 111 (i.e., cells) is, for example, substantially circular. In FIG. 1, the diameter of each through hole 111 is larger than the actual diameter, and the number of through holes 111 is smaller than the actual number. The zeolite membrane 12 is formed on an inner peripheral surface of each through hole 111, covering substantially the entire inner peripheral surface of the through hole 111.

The length of the support 11 (i.e., the length in the left and right direction of FIG. 1) is, for example, 10 cm to 200 cm. The outer diameter of the support 11 is, for example, 0.5 cm to 30 cm. The distance between the central axes of adjacent through holes 111 is, for example, 0.3 mm to 10 mm. The surface roughness (Ra) of the support 11 is, for example, 0.1 μm to 5.0 μm, and preferably 0.2 μm to 2.0 μm. Further, the shape of the support 11 may be, for example, honeycomb-like, flat plate-like, tubular, cylindrical, columnar, polygonal prismatic, or the like. When the support 11 has a tubular or cylindrical shape, the thickness of the support 11 is, for example, 0.1 mm to 10 mm.

As the material for the support 11, various materials (for example, ceramics or a metal) may be adopted only if the materials ensure chemical stability in the process step of forming the zeolite membranes 12 on the surface thereof. In the present preferred embodiment, the support 11 is formed of a ceramic sintered body. Examples of the ceramic sintered body which is selected as a material for the support 11 include alumina, silica, mullite, zirconia, titania, yttria, silicon nitride, silicon carbide, and the like. In the present preferred embodiment, the support 11 contains at least one kind of alumina, silica, and mullite.

The support 11 may contain an inorganic binder. As the inorganic binder, at least one of titania, mullite, easily sinterable alumina, silica, glass frit, a clay mineral, and easily sinterable cordierite can be used.

The average pore diameter of the support 11 is, for example, 0.01 μm to 70 μm, and preferably 0.05 μm to 25 μm. The average pore diameter of the support 11 in the vicinity of the surface on which the zeolite membrane 12 is formed is 0.01 μm to 1 μm, and preferably 0.05 μm to 0.5 μm. The average pore diameter can be measured by using, for example, a mercury porosimeter, a perm porometer, or a nano-perm porometer. Regarding the pore diameter distribution of the entire support 11 including the surface and the inside thereof, D5 is, for example, 0.01 μm to 50 μm, D50 is, for example, 0.05 μm to 70 μm, and D95 is, for example, 0.1 μm to 2000 μm. The porosity of the support 11 in the vicinity of the surface on which the zeolite membrane 12 is formed is, for example, 20% to 60%.

The support 11 has, for example, a multilayer structure in which a plurality of layers with different average pore diameters are layered in a thickness direction. The average pore diameter and the sintered particle diameter in a surface layer including the surface on which the zeolite membrane 12 is formed are smaller than those in layers other than the surface layer. The average pore diameter in the surface layer of the support 11 is, for example, 0.01 μm to 1 μm, and preferably 0.05 μm to 0.5 μm. When the support 11 has a multilayer structure, the materials for the respective layers can be those described above. The materials for the plurality of layers constituting the multilayer structure may be the same as or different from one another.

The zeolite membrane 12 is a porous membrane having micropores. The zeolite membrane 12 can be used as a separation membrane for separating a specific substance from a mixed substance in which a plurality of types of substances are mixed, by using a molecular sieving function. As compared with the specific substance, any one of the other substances is harder to permeate the zeolite membrane 12. In other words, the permeance of any other substance through the zeolite membrane 12 is smaller than that of the above specific substance. The surface roughness (Ra) of the zeolite membrane 12 is, for example, 5 μm or less, preferably 2 μm or less, more preferably 1 μm or less, and further preferably 0.5 μm or less.

The zeolite membrane 12 is composed of zeolite having an RHO-type structure. In other words, the zeolite membrane 12 is composed of zeolite having a structure code of "RHO" which is designated by the International Zeolite Association. A later-described XRD pattern shown in FIG. 3, which is obtained from a surface of the zeolite membrane 12 coincides in the positions of peaks with an XRD pattern assumed from the structure of RHO-type zeolite. The zeolite membrane 12 is typically composed only of RHO-type zeolite, but depending on the production method or the like, any substance other than the RHO-type zeolite may be contained slightly (for example, 1 mass % or less) in the zeolite membrane 12.

The maximum number of membered rings of the RHO-type zeolite is 8, and herein an arithmetic average of the short diameter and the long diameter of an 8-membered ring pore is defined as the average pore diameter. The 8-membered ring pore refers to a micropore in which the number of oxygen atoms in the portion where the oxygen atoms and later-described T atoms are bonded to form a ring structure is 8. The unique pore diameter of the RHO-type zeolite is 0.36 nm×0.36 nm, and the average pore diameter is 0.36 nm. The average pore diameter of the zeolite membrane 12 is smaller than that of the support 11 in the vicinity of the surface on which the zeolite membrane 12 is formed.

One example of the RHO-type zeolite composing the zeolite membrane 12 is aluminosilicate zeolite in which atoms (T-atoms) located at the center of an oxygen tetrahedron ($TO_4$) constituting the zeolite consist of silicon (Si) and aluminum (Al). Some of the T-atoms may be replaced by any other element (gallium, titanium, vanadium, iron, zinc, tin, or the like). This makes it possible to change a pore diameter or adsorption properties. In the zeolite membrane 12, a molar ratio of silicon/aluminum (which is a value obtained by dividing the number of moles of silicon atoms by the number of moles of aluminum atoms, and the same applies to the following) is preferably 1 to 10, more preferably 1.1 to 5, and further preferably 1.2 to 3. This improves the hydrophilic property of the zeolite membrane 12. The molar ratio of silicon/aluminum can be measured by the EDS (energy dispersive X-ray spectroscopic analysis). By adjusting the mixing ratio in a starting material solution described later, or the like, it is possible to adjust the silicon/aluminum ratio in the zeolite membrane 12 (the same applies to the ratio of any other elements). As a matter of course, the RHO-type zeolite is not limited to the aluminosilicate-type one.

Typically, the zeolite membrane 12 contains sodium (Na). A molar ratio of sodium/aluminum in the zeolite membrane 12 is preferably 10 to 100, and more preferably 20 to 90. This can stabilize the structure of the RHO-type zeolite (suppress the collapse of the crystals, or the like). It is preferable that the zeolite membrane 12 should further contain cesium (Cs). A molar ratio of cesium/aluminum in the zeolite membrane 12 is preferably 0.5 to 3.0, and more preferably 1.0 to 2.0. The zeolite membrane 12 may contain any other alkali metal such as potassium (K), rubidium (Rb), or the like. Further, some or all of the cations may be replaced by proton ($H^+$), ammonium ion ($NH_4^+$), or the like by ion exchange or the like.

One example of the zeolite membrane 12 is produced by not using an organic substance termed a structure-directing agent (hereinafter, also referred to as an "SDA"), and in this case, the zeolite membrane 12 does not contain the SDA. In the zeolite membrane 12 not containing the SDA, pores are appropriately secured. The zeolite membrane 12 may be produced by using the SDA. In this case, it is preferable that after forming the zeolite membrane 12, the SDA should be almost or completely removed. As the SDA, for example, 18-crown-6-ether or the like can be used.

Figure 3:
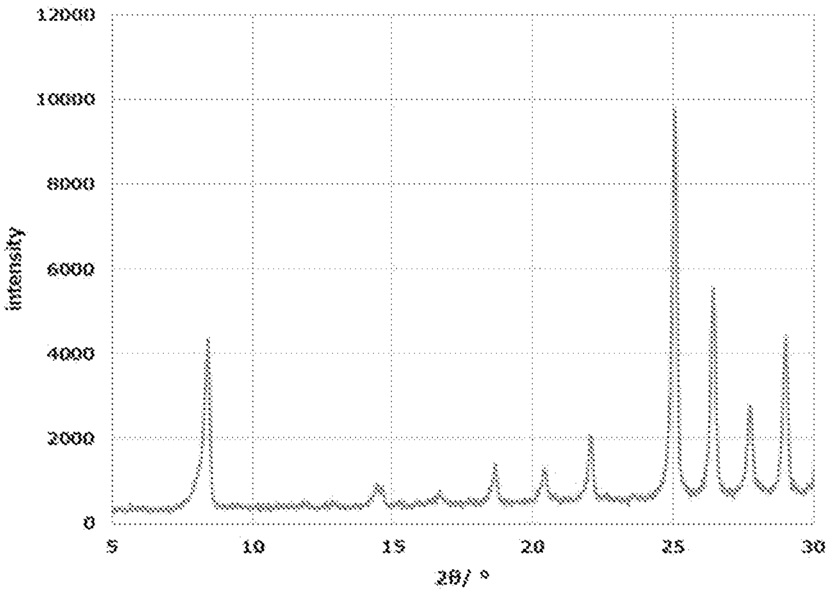
FIG. 3 is a view showing an X-ray diffraction pattern obtained from a surface of a zeolite membrane.

FIG. 3 is a view showing one example of an X-ray diffraction (XRD) pattern obtained by emitting an X-ray onto the surface of the zeolite membrane 12. For the acquisition of the XRD pattern, for example, a CuKα ray is used as a radiation source of an X-ray diffraction apparatus, but any other type of radiation source may be used. As described earlier, the XRD pattern obtained from the zeolite membrane 12 coincides in the positions of peaks with an XRD pattern assumed from the structure of RHO-type zeolite.

In the zeolite membrane 12, the peak intensity in the vicinity of $2\theta=18.7°$ in the XRD pattern is not higher than 0.4 times the peak intensity in the vicinity of $2\theta=8.3°$, and the peak intensity in the vicinity of $2\theta=14.4°$ is not higher than 0.3 times the peak intensity in the vicinity of $2\theta=8.3°$. The peak in the vicinity of $2\theta=18.7°$ is a peak present in a range of $2\theta=18.7°\pm0.9°$, and is derived from a (310) plane of the RHO-type zeolite. The peak in the vicinity of $2\theta=8.3°$ is a peak present in a range of $2\theta=8.3°\pm0.6°$, and is derived from a (110) plane thereof. The peak in the vicinity of $2\theta=14.4°$ is a peak present in a range of $2\theta=14.4°\pm0.8°$, and is derived from a (211) plane thereof. Therefore, in the zeolite membrane 12, the peak intensity derived from the (310) plane of RHO-type zeolite is not higher than 0.4 times the peak intensity derived from the (110) plane thereof and the peak intensity derived from the (211) plane is not higher than 0.3 times the peak intensity derived from the (110) plane. Thus, the zeolite membrane 12 is an orientation film (membrane) in which the peak intensity derived from the (110) plane is relatively high.

It is preferable that a ratio obtained by dividing the peak intensity derived from the (310) plane by the peak intensity derived from the (110) plane should be not higher than 0.3. The lower limit of this ratio is not particularly limited, but, for example, 0.05. It is preferable that a ratio obtained by dividing the peak intensity derived from the (211) plane by the peak intensity derived from the (110) plane should be not higher than 0.2. The lower limit of this ratio is not particularly limited, but, for example, 0.05. Further, it is assumed that the peak intensity uses a height of the XRD pattern except a baseline thereof, i.e., a background noise component. The baseline in the XRD pattern can be obtained, for example, by the Sonneveld-Visser method or a spline interpolation method.

Figure 4:
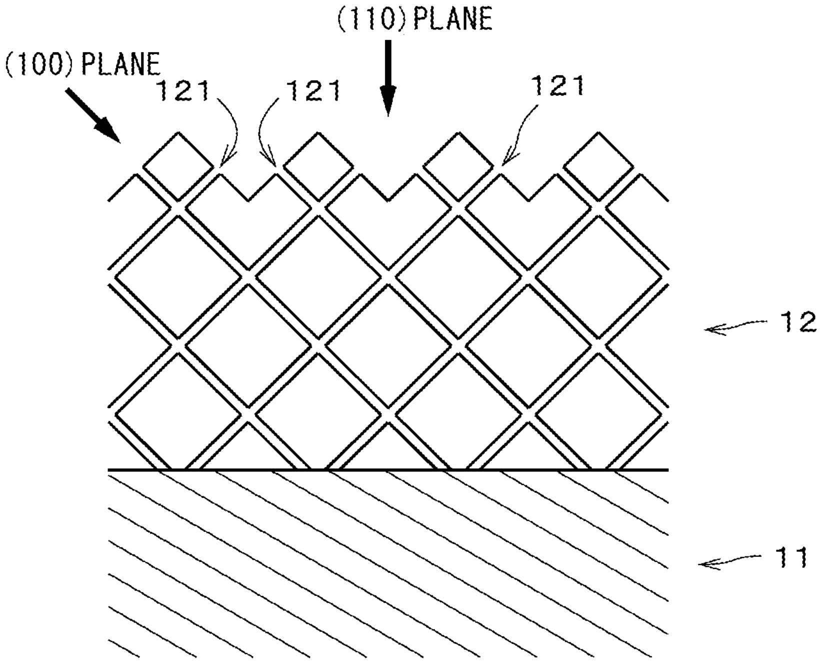
FIG. 4 is a view schematically showing a crystal structure of the zeolite membrane.

FIG. 4 is a view schematically showing a crystal structure of the zeolite membrane 12. In FIG. 4, a later-described composite layer 13 is not shown. In the RHO-type zeolite, formed are continuous pores in which the 8-membered ring pores are continuous. In the zeolite membrane 12 in which the peak intensity derived from the (110) plane is relatively high, the (110) plane is oriented nearly parallel to the surface of the zeolite membrane 12, and openings 121 of many continuous pores are positioned on the surface. In later-described separation of the mixed substance, since access to the continuous pores of a substance with high permeability (hereinafter, referred to as a "high permeability substance") to the zeolite membrane 12 is thereby increased, the permeance (permeation rate) of the high permeability substance in the zeolite membrane 12 increases and the separation performance also increases.

In the zeolite membrane complex 1 of FIG. 2, in the formation of the zeolite membrane 12, the RHO-type zeolite is synthesized also in the pores of the support 11. In other words, in the support 11, a layer 13 (hereinafter, referred to as a "composite layer 13") is provided, with part of the zeolite membrane 12 entering the pores. As described earlier, in FIG. 2, the zeolite membrane 12 and the composite layer 13 are hatched. In the present specification, the composite layer 13 is assumed as part of the support 11. The composite layer 13 is provided in an interface between the zeolite membrane 12 and the support 11. In a preferable zeolite membrane complex 1, the thickness of the composite layer 13 is smaller than that of the zeolite membrane 12 (in other words, the thickness of the membrane of the RHO-type zeolite except the composite layer 13) on the support 11.

Herein, measurement of the respective thicknesses of the zeolite membrane 12 and the composite layer 13 will be described. In this measurement of the thickness, first, a cross section perpendicular to the inner peripheral surface of the through hole 111 which is a formation surface for the zeolite membrane 12 is exposed, for example, by cross section polishing. The cross section is imaged by using a scanning electron microscope (SEM), and a SEM image is thereby acquired. As shown in FIG. 2, the SEM image represents the surroundings of the composite layer 13. The magnification of the SEM image is, for example, 5000 times.

Subsequently, in the vicinity of one measurement position in a direction along the formation surface (the interface between the support 11 and the zeolite membrane 12) in the SEM image, a boundary position of the composite layer 13 in a direction perpendicular to the formation surface (hereinafter, referred to as a "depth direction") is specified. The boundary position in the composite layer 13 on the side of the zeolite membrane 12 is the interface between the zeolite membrane 12 and the support 11, and in more detail, the boundary position is a vertex of a particle of the support 11, which is positioned on the most side of the zeolite membrane 12 in the depth direction (in other words, a particle positioned at the uppermost layer of the support 11). A boundary position in the composite layer 13 on the opposite side of the zeolite membrane 12 is an edge (in other words, an inner end portion of the composite layer 13) of the zeolite farthest away from the zeolite membrane 12 in the depth direction, among the zeolites existing in the pores of the support 11.

Then, a distance T3 in the depth direction between the boundary position in the composite layer 13 on the side of the zeolite membrane 12 and the boundary position on the opposite side of the zeolite membrane 12 is acquired as the thickness of the composite layer 13 at the measurement position. Further, a distance T2 in the depth direction between a position of the surface of the zeolite membrane 12 away from the support 11 and the boundary position in the composite layer 13 on the side of the zeolite membrane 12 is acquired as the thickness of the zeolite membrane 12 at the measurement position. In the present preferred embodiment, an average value of the thicknesses of the composite layer 13 at a plurality of different measurement positions (for example, 10 measurement positions) is determined as the thickness of the composite layer 13 in the zeolite membrane complex 1. Further, an average value of the thicknesses of the zeolite membrane 12 at the plurality of different measurement positions is determined as the thickness of the zeolite membrane 12 in the zeolite membrane complex 1.

The thickness of the zeolite membrane 12 is, for example, 0.05 μm to 30 μm. The thickness of the zeolite membrane 12 is preferably not larger than 5 μm, more preferably not larger than 4 μm, and further preferably not larger than 3 μm. When the thickness of the zeolite membrane 12 is reduced, the permeance of the high permeability substance further increases. The thickness of the zeolite membrane 12 is preferably not smaller than 0.1 μm, and more preferably not smaller than 0.5 μm. When the thickness of the zeolite membrane 12 is increased, the separation performance increases.

As described earlier, in the preferable zeolite membrane complex 1, the thickness of the composite layer 13 is smaller than that of the zeolite membrane 12 on the support 11. The thickness of the composite layer 13 is more preferably not larger than 0.8 times that of the zeolite membrane 12, and further preferably not larger than 0.5 times that of the zeolite membrane 12. The thickness of the composite layer 13 is preferably not larger than 1 μm, more preferably smaller than 1 μm, and further preferably not larger than 0.5 μm. Since the thickness of the composite layer 13 is small, it is possible to suppress permeation of the high permeability substance from being inhibited in the composite layer 13 and the permeance of the high permeability substance is further increased. It is preferable that the thickness of the composite layer 13 should be as small as possible, and the lower limit of the thickness is not particularly limited, but, for example, 0.01 μm. The composite layer 13 does not have to exist.

Figure 5:
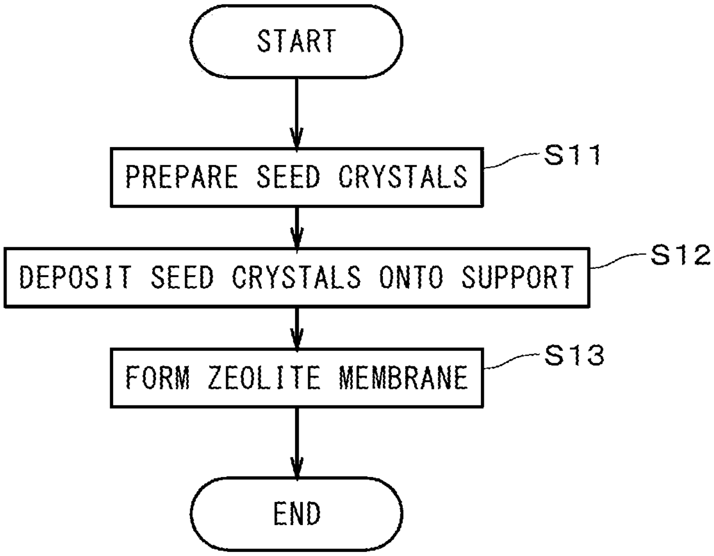
FIG. 5 is a flowchart showing a flow for producing the zeolite membrane complex.

Next, with reference to FIG. 5, an exemplary flow of producing the zeolite membrane complex 1 will be described. In the production of the zeolite membrane complex 1, first, seed crystals to be used for production of the zeolite membrane 12 are prepared (Step S11). For example, ROH-type zeolite powder is synthesized by hydrothermal synthesis, and the seed crystals are acquired from the zeolite powder. The ROH-type zeolite powder may be synthesized by any or well-known production method (for example, the method in above-described Document 1 or Document 2). The zeolite powder itself may be used as the seed crystals, or may be processed by pulverization or the like, to thereby acquire the seed crystals. Further, in later-described Examples, by mixing the powder (seed crystals) of the RHO-type zeolite into a starting material solution to be used for synthesizing the seed crystals, the seed crystals can be synthesized in a short time, but the starting material solution to be used for synthesizing the seed crystals does not have to contain the powder.

Further, as the RHO-type zeolite to be used for the seed crystals, the RHO-type zeolite containing the SDA may be used or the RHO-type zeolite not containing the SDA may be used. The RHO-type zeolite not containing the SDA can be synthesized by not using the SDA or can be obtained by synthesis using the SDA and then burning or the like. Since reduction in the permeability is hard to occur even in a case where the seed crystals are not completely dissolved and remain, it is preferable that the RHO-type zeolite not using the SDA should be used as the seed crystals.

Further, pulverized seed crystals may be used as necessary. In order to suppress reduction in the crystallinity of the seed crystals by pulverization and accordingly reduction in the crystallinity of the membrane, it is preferable that the peak intensity in the vicinity of $2\theta=8.3°$ derived from the (110) plane of the RHO-type zeolite should not be reduced by 95% or more by pulverization (in other words, the peak intensity after the pulverization should be larger than 5% of the peak intensity before the pulverization).

Subsequently, the support 11 is immersed in a dispersion liquid in which the seed crystals are dispersed, and the seed crystals are thereby deposited onto the support 11 (Step S12). Alternatively, the dispersion liquid in which the seed crystals are dispersed is brought into contact with a portion on the support 11 where the zeolite membrane 12 is to be formed, and the seed crystals are thereby deposited onto the support 11. A support with seed crystals deposited is thereby produced. The seed crystals may be deposited onto the support 11 by any other method.

The support 11 on which the seed crystals are deposited is immersed in a starting material solution. The starting material solution is produced, for example, by dissolving or dispersing a silicon source, an aluminum source, an alkali source (a sodium source, a cesium source, or the like), or the like in water serving as a solvent. The silicon source is, for example, colloidal silica, water glass, fumed silica, or the like. The aluminum source is, for example, aluminum hydroxide, sodium aluminate, aluminum sulfate, or the like. The sodium source is, for example, sodium hydroxide, sodium chloride, sodium bromide, or the like. The cesium source is, for example, cesium hydroxide, cesium chloride, or the like.

In the starting material solution, the molar ratio of silicon/aluminum is 2 to 20, preferably 3 to 15, and more preferably 4 to 10. The molar ratio of sodium/aluminum is 10 to 100, preferably 20 to 90, and more preferably 30 to 80. The molar ratio of cesium/aluminum is 0.5 to 10, preferably 0.7 to 5.0, and more preferably 1.0 to 2.0. The molar ratio of water/aluminum is 500 to 5000, preferably 1000 to 4000, and more preferably 1500 to 3000. The viscosity of the starting material solution at 20° C. is, for example, 1 to 150 mPa·s, preferably 2 to 100 mPa·s, and more preferably 3 to 50 mPa·s. The viscosity of the starting material solution can be measured by using, for example, an ultrasonic desktop viscosity meter (FCV-100H manufactured by Fuji Ultrasonic Engineering Co., Ltd.). It is preferable that the starting material solution should not contain the SDA, but the starting material solution may contain the SDA. Any other raw material may be mixed in the starting material solution, and any substance other than water may be used as the solvent of the starting material solution.

After the immersion of the support 11 in the starting material solution, RHO-type zeolite is caused to grow from the seed crystals on the support 11 as nuclei by the hydrothermal synthesis, to thereby form the RHO-type zeolite membranes 12 on the support 11 (Step S13). The temperature in the hydrothermal synthesis is preferably 60 to 200° C. The time for hydrothermal synthesis is preferably 1 to 20 hours. As the time for hydrothermal synthesis becomes shorter, the production cost of the zeolite membrane complex 1 can be reduced. After the hydrothermal synthesis is finished, the support 11 and the zeolite membrane 12 are washed with pure water. The support 11 and the zeolite membrane 12 after being washed are dried at, for example, 50° C. Through the above-described process, the dense zeolite membrane 12 is formed, and the above-described zeolite membrane complex 1 having high separation performance and high permeance is produced. In a case where the starting material solution contains the SDA, a heat treatment is performed on the zeolite membrane 12 under an oxidizing gas atmosphere, to thereby burn and remove the SDA in the zeolite membrane 12. Preferably, the SDA is almost completely removed.

The particle diameter of the zeolite particles composing the zeolite membrane 12 is, for example, 0.01 μm to 1 μm, preferably 0.05 μm to 0.9 μm, and more preferably 0.1 μm to 0.8 μm. The particle diameter of the zeolite particles is obtained by observing the surface of the zeolite membrane 12 by the scanning electron microscope (SEM) and performing an arithmetic average of the particle diameters of arbitrary twenty zeolite particles.

Ion exchange may be performed on the zeolite membrane 12 as necessary. In a case where the Cs source is used for synthesizing the RHO-type zeolite membrane, it can be expected to increase the separation factor due to the existence of the Cs ions in the pores, but the permeation coefficient is sometimes reduced. As the ions for exchange, proton, ammonium ion, alkali metal ion such as $Na^+$, $K^+$, $Li^+$, or the like, alkaline earth metal ion such as $Ca^{2+}$, $Mg^{2+}$, $Sr^{2+}$, $Ba^{2+}$, or the like, and transition metal ion such as $Fe^{2+}$, $Fe^{3+}$, $Cu^{2+}$, $Zn^{2+}$, $Ag^+$, or the like may be used.

Figure 6:
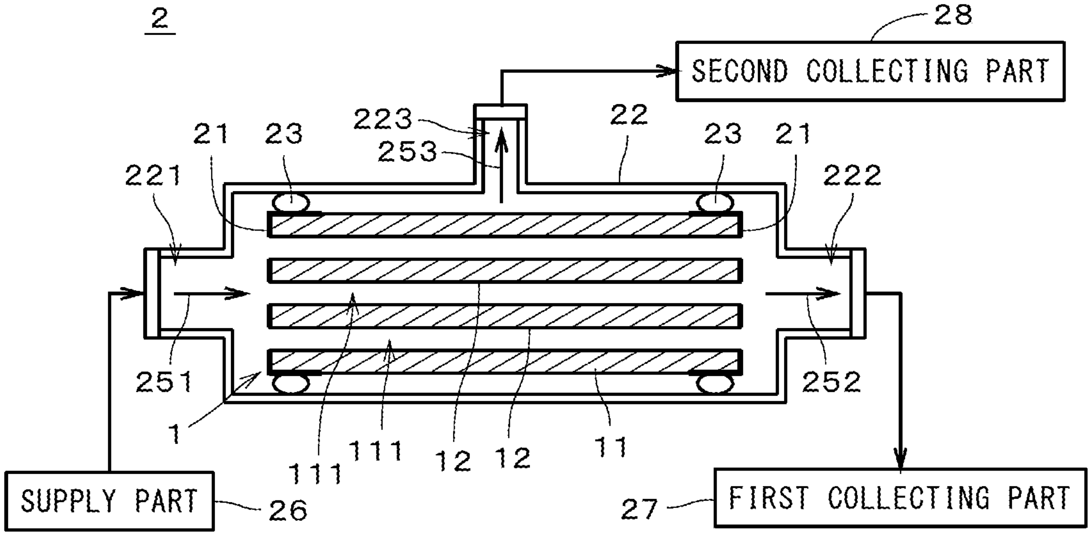
FIG. 6 is a diagram showing a separation apparatus.
Figure 7:
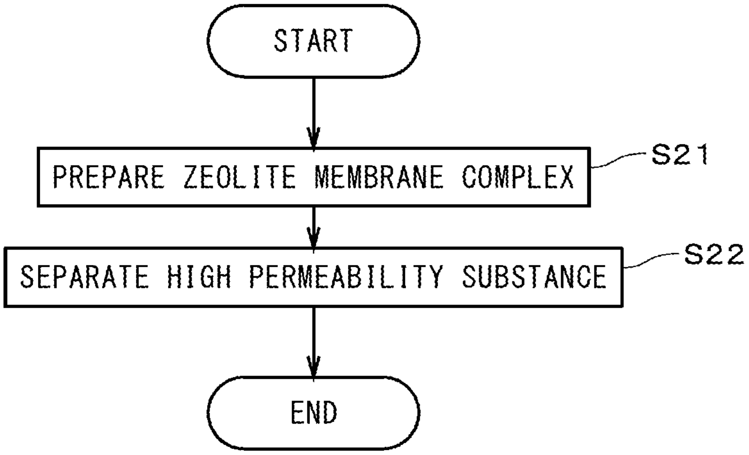
FIG. 7 is a flowchart showing a flow for separating a mixed substance.

Next, with reference to FIGS. 6 and 7, separation of a mixed substance by using the zeolite membrane complex 1 will be described. FIG. 6 is a view showing a separation apparatus 2. FIG. 7 is a flowchart showing a flow for separating the mixed substance by the separation apparatus 2.

In the separation apparatus 2, a mixed substance containing a plurality of types of fluids (i.e., gases or liquids) is supplied to the zeolite membrane complex 1, and a substance with high permeability (i.e., a high permeability substance) in the mixed substance is caused to permeate the zeolite membrane complex 1, to be thereby separated from the mixed substance. Separation in the separation apparatus 2 may be performed, for example, in order to extract a high permeability substance from a mixed substance, or in order to concentrate a substance with low permeability (hereinafter, referred to also as a "low permeability substance").

The mixed substance (i.e., mixed fluid) may be a mixed gas containing a plurality of types of gases, may be a mixed liquid containing a plurality of types of liquids, or may be a gas-liquid two-phase fluid containing both a gas and a liquid.

The mixed substance contains at least one of, for example, hydrogen ($H_2$), helium (He), nitrogen ($N_2$), oxygen ($O_2$), water ($H_2O$), water vapor ($H_2O$), carbon monoxide (CO), carbon dioxide ($CO_2$), nitrogen oxide, ammonia ($NH_3$), sulfur oxide, hydrogen sulfide ($H_2S$), sulfur fluoride, mercury (Hg), arsine ($AsH_3$), hydrogen cyanide (HCN), carbonyl sulfide (COS), C1 to C8 hydrocarbons, organic acid, alcohol, mercaptans, ester, ether, ketone, and aldehyde. The above-described high permeability substance is at least one kind of, for example, $H_2$, He, $N_2$, $O_2$, $CO_2$, $NH_3$, and $H_2O$, and preferably $H_2O$.

The nitrogen oxide is a compound of nitrogen and oxygen. The above-described nitrogen oxide is, for example, a gas called NOx such as nitric oxide (NO), nitrogen dioxide ($NO_2$), nitrous oxide (also referred to as dinitrogen monoxide) ($N_2O$), dinitrogen trioxide ($N_2O_3$), dinitrogen tetroxide ($N_2O_4$), dinitrogen pentoxide ($N_2O_5$), or the like.

The sulfur oxide is a compound of sulfur and oxygen. The above-described sulfur oxide is, for example, a gas called $SO_X$ such as sulfur dioxide ($SO_2$), sulfur trioxide ($SO_3$), or the like.

The sulfur fluoride is a compound of fluorine and sulfur. The above-described sulfur fluoride is, for example, disulfur difluoride (F—S—S—F, $S{=}SF_2$), sulfur difluoride ($SF_2$), sulfur tetrafluoride ($SF_4$), sulfur hexafluoride ($SF_6$), disulfur decafluoride ($S_2F_{10}$), or the like.

The C1 to C8 hydrocarbons are hydrocarbons with not less than 1 and not more than 8 carbon atoms. The C3 to C8 hydrocarbons may be any one of a linear-chain compound, a side-chain compound, and a ring compound. Further, the C2 to C8 hydrocarbons may either be a saturated hydrocarbon (i.e., in which there is no double bond or triple bond in a molecule), or an unsaturated hydrocarbon (i.e., in which there is a double bond and/or a triple bond in a molecule). The C1 to C4 hydrocarbons are, for example, methane ($CH_4$), ethane ($C_2H_6$), ethylene ($C_2H_4$), propane ($C_3H_8$), propylene ($C_3H_6$), normal butane ($CH_3(CH_2)_2CH_3$), isobutane ($CH(CH_3)_3$), 1-butene ($CH_2{=}CHCH_2CH_3$), 2-butene ($CH_3CH{=}CHCH_3$), or isobutene ($CH_2{=}C(CH_3)_2$).

The above-described organic acid is carboxylic acid, sulfonic acid, or the like. The carboxylic acid is, for example, formic acid ($CH_2O_2$), acetic acid ($C_2H_4O_2$), oxalic acid ($C_2H_2O_4$), acrylic acid ($C_3H_4O_2$), benzoic acid ($C_6H_5COOH$), or the like. The sulfonic acid is, for example, ethanesulfonic acid ($C_2H_6O_3S$) or the like. The organic acid may either be a chain compound or a ring compound.

The above-described alcohol is, for example, methanol ($CH_3OH$), ethanol ($C_2H_5OH$), isopropanol (2-propanol) ($CH_3CH(OH)CH_3$), ethylene glycol ($CH_2(OH)CH_2(OH)$), butanol ($C_4H_9OH$), or the like.

The mercaptans are an organic compound having hydrogenated sulfur (SH) at the terminal end thereof, and are a substance also referred to as thiol or thioalcohol. The above-described mercaptans are, for example, methyl mercaptan ($CH_3SH$), ethyl mercaptan ($C_2H_5SH$), 1-propanethiol ($C_3H_7SH$), or the like.

The above-described ester is, for example, formic acid ester, acetic acid ester, or the like.

The above-described ether is, for example, dimethyl ether ($(CH_3)_2O$), methyl ethyl ether ($C_2H_5OCH_3$), diethyl ether ($(C_2H_5)_2O$), or the like.

The above-described ketone is, for example, acetone ($(CH_3)_2CO$), methyl ethyl ketone ($C_2H_5COCH_3$), diethyl ketone ($(C_2H_5)_2CO$), or the like.

The above-described aldehyde is, for example, acetaldehyde ($CH_3CHO$), propionaldehyde ($C_2H_5CHO$), butanal (butylaldehyde) ($C_3H_7CHO$), or the like.

In the following description, it is assumed that the mixed substance to be separated by the separation apparatus 2 is a mixed liquid containing a plurality of types of liquids.

The separation apparatus 2 includes the zeolite membrane complex 1, sealing parts 21, a housing 22, two sealing members 23, a supply part 26, a first collecting part 27, and a second collecting part 28. The zeolite membrane complex 1, the sealing parts 21, and the sealing members 23 are accommodated inside the housing 22. The supply part 26, the first collecting part 27, and the second collecting part 28 are disposed outside the housing 22 and connected to the housing 22.

The sealing parts 21 are members which are attached to both end portions in the longitudinal direction (i.e., in the left and right direction of FIG. 6) of the support 11 and cover and seal both end surfaces in the longitudinal direction of the support 11 and outer peripheral surfaces in the vicinity of the end surfaces. The sealing parts 21 prevent a liquid from flowing into or out from both the end surfaces of the support 11. The sealing part 21 is, for example, a plate-like member formed of glass or a resin. The material and the shape of the sealing part 21 may be changed as appropriate. Further, since the sealing part 21 is provided with a plurality of openings which coincide with the plurality of through holes 111 of the support 11, both ends of each through hole 111 of the support 11 in the longitudinal direction are not covered by the sealing parts 21. Therefore, the liquid or the like can flow into and out from the through hole 111 from both ends thereof.

There is no particular limitation on the shape of the housing 22 but is, for example, a tubular member having a substantially cylindrical shape. The housing 22 is formed of, for example, stainless steel or carbon steel. The longitudinal direction of the housing 22 is substantially in parallel to the longitudinal direction of the zeolite membrane complex 1. A supply port 221 is provided at an end portion on one side in the longitudinal direction of the housing 22 (i.e., an end portion on the left side in FIG. 6), and a first exhaust port 222 is provided at another end portion on the other side. A second exhaust port 223 is provided on a side surface of the housing 22. The supply part 26 is connected to the supply port 221. The first collecting part 27 is connected to the first exhaust port 222. The second collecting part 28 is connected to the second exhaust port 223. An internal space of the housing 22 is a sealed space that is isolated from the space around the housing 22.

The two sealing members 23 are arranged around the entire circumference between an outer peripheral surface of the zeolite membrane complex 1 and an inner peripheral surface of the housing 22 in the vicinity of both end portions of the zeolite membrane complex 1 in the longitudinal direction. Each of the sealing members 23 is a substantially annular member formed of a material that the liquid cannot permeate. The sealing member 23 is, for example, an O-ring formed of a flexible resin. The sealing members 23 come into close contact with the outer peripheral surface of the zeolite membrane complex 1 and the inner peripheral surface of the housing 22 around the entire circumferences thereof. In the exemplary case of FIG. 6, the sealing members 23 come into close contact with outer peripheral surfaces of the sealing parts 21 and indirectly come into close contact with the outer peripheral surface of the zeolite membrane complex 1 with the sealing parts 21 interposed therebetween. The portions between the sealing members 23 and the outer peripheral surface of the zeolite membrane complex 1 and between the sealing members 23 and the inner peripheral surface of the housing 22 are sealed, and it is thereby mostly or completely impossible for the liquid to pass through the portions.

The supply part 26 supplies the mixed liquid into the internal space of the housing 22 through the supply port 221. The supply part 26 includes, for example, a pump for pumping the mixed liquid toward the housing 22. The pump includes a temperature regulating part and a pressure regulating part which regulate the temperature and the pressure of the mixed liquid, respectively, to be supplied to the housing 22. The first collecting part 27 includes, for example, a storage container for storing the liquid led out from the housing 22 or a pump for transporting the liquid. The second collecting part 28 includes, for example, a vacuum pump for decompressing a space outside the outer peripheral surface of the zeolite membrane complex 1 inside the housing 22 (in other words, a space sandwiched between the two sealing members 23) and a liquid nitrogen trap for cooling and liquefying the gas permeating the zeolite membrane complex 1 while gasifying.

When separation of the mixed liquid is performed, the above-described separation apparatus 2 is prepared and the zeolite membrane complex 1 is thereby prepared (FIG. 7: Step S21). Subsequently, the supply part 26 supplies a mixed liquid containing a plurality of types of liquids with different permeabilities to the zeolite membrane 12 into the internal space of the housing 22. For example, the main component of the mixed liquid includes water ($H_2O$) and ethanol ($C_2H_5OH$). The mixed liquid may contain any liquid other than water and ethanol. The pressure (i.e., feed pressure) of the mixed liquid to be supplied into the internal space of the housing 22 from the supply part 26 is, for example, 0.1 MPa to 2 MPa. The temperature of the mixed liquid is, for example, 10° C. to 200° C.

The mixed liquid supplied from the supply part 26 into the housing 22 is fed from the left end of the zeolite membrane complex 1 in this figure into the inside of each through hole 111 of the support 11 as indicated by an arrow 251. A high permeability substance which is a liquid with high permeability in the mixed liquid permeates the zeolite membrane 12 provided on the inner peripheral surface of each through hole 111 and the support 11 while gasifying, and is led out from the outer peripheral surface of the support 11. The high permeability substance (for example, water) is thereby separated from a low permeability substance which is a liquid with low permeability (for example, ethanol) in the mixed liquid (Step S22).

The gas (hereinafter, referred to as a "permeate substance") led out from the outer peripheral surface of the support 11 is guided to the second collecting part 28 through the second exhaust port 223 as indicated by an arrow 253 and cooled and collected by the second collecting part 28 as a liquid. The pressure (i.e., permeate pressure) of the gas to be collected by the second collecting part 28 through the second exhaust port 223 is, for example, about 50 Torr (about 6.67 kPa). In the permeate substance, the low permeability substance permeating the zeolite membrane 12 may be included as well as the above-described high permeability substance.

Further, in the mixed liquid, a liquid (hereinafter, referred to as a "non-permeate substance") other than the liquid which has permeated the zeolite membrane 12 and the support 11 passes through each through hole 111 of the support 11 from the left side to the right side in this figure and is collected by the first collecting part 27 through the first exhaust port 222 as indicated by an arrow 252. The pressure of the liquid to be collected by the first collecting part 27 through the first exhaust port 222 is, for example, substantially the same as the feed pressure. The non-permeate substance may include a high permeability substance that has not permeated the zeolite membrane 12, as well as the above-described low permeability substance. The non-permeate substance collected by the first collecting part 27 may be, for example, circulated to the supply part 26 and supplied again into the housing 22.

Next, Examples of the zeolite membrane complex will be described. In Table 1, shown are the composition (composition in terms of oxide) of the starting material solution for forming the zeolite membrane, which is prepared in Examples 1 to 7 and Comparative Examples 1 and 2, and the conditions of the hydrothermal synthesis.

TABLE 1

| | Composition of Starting Material Solution | Hydrothermal Synthesis: Synthesis Temperature (° C.) | Hydrothermal Synthesis: Synthesis Time (hr) |
|---|---|---|---|
| Example 1 | 10 $SiO_2$:1 $Al_2O_3$:40 $Na_2O$:10 $Cs_2O$:2000 $H_2O$ | 100 | 10 |
| Example 2 | 10 $SiO_2$:1 $Al_2O_3$:100 $Na_2O$:10 $Cs_2O$:2000 $H_2O$ | 100 | 10 |
| Example 3 | 10 $SiO_2$:1 $Al_2O_3$:10 $Na_2O$:10 $Cs_2O$:2000 $H_2O$ | 100 | 10 |
| Example 4 | 20 $SiO_2$:1 $Al_2O_3$:40 $Na_2O$:10 $Cs_2O$:2000 $H_2O$ | 100 | 10 |
| Example 5 | 10 $SiO_2$:1 $Al_2O_3$:40 $Na_2O$:10 $Cs_2O$:5000 $H_2O$ | 100 | 10 |
| Example 6 | 20 $SiO_2$:1 $Al_2O_3$:10 $Na_2O$:1 $Cs_2O$:1000 $H_2O$ | 110 | 10 |
| Example 7 | 10 $SiO_2$:1 $Al_2O_3$:40 $Na_2O$:10 $Cs_2O$:2000 $H_2O$ | 100 | 10 |
| Comparative Example 1 | 10.8 $SiO_2$:1 $Al_2O_3$:3 $Na_2O$:0.4 $Cs_2O$:110 $H_2O$ | 110 | 144 |
| Comparative Example 2 | 10.8 $SiO_2$:1 $Al_2O_3$:3 $Na_2O$:0.4 $Cs_2O$:110 $H_2O$ | 110 | 24 |

(Example 1) Colloidal silica (Snowtex-S manufactured by Nissan Chemical Corporation), aluminum hydroxide (manufactured by Sigma-Aldrich Co. LLC), sodium hydroxide (manufactured by Sigma-Aldrich Co. LLC), 50% aqueous solution of cesium hydroxide, and ion exchange water are compounded in 100 g to have a molar ratio of 10.8 $SiO_2$:1$Al_2O_3$:3$Na_2O$:0.4$Cs_2O$:110$H_2O$ and blended in a shaker for one night (12 hours or more). To the obtained gel, 0.1 g of powder of RHO-type zeolite (seed crystals in the synthesis of seed crystals) which is separately prepared is added. The gel is heated at 100° C. for 30 hours to perform hydrothermal synthesis, to thereby obtain seed crystals. After that, the seed crystals obtained as above are applied to a tubular zirconia porous support having a diameter of 10 mm and a length of 160 mm.

Subsequently, as a starting material solution for zeolite membrane formation (synthetic sol), colloidal silica (Snowtex-S manufactured by Nissan Chemical Corporation), aluminum hydroxide (manufactured by Sigma-Aldrich Co. LLC), sodium hydroxide (manufactured by Sigma-Aldrich Co. LLC), 50% aqueous solution of cesium hydroxide, and ion exchange water are compounded in 200 g to have a molar ratio of 10$SiO_2$:1 $Al_2O_3$:40$Na_2O$:10$Cs_2O$:2000$H_2O$ and blended in a shaker for one night. When the viscosity of the starting material solution at 20° C. is measured by using the ultrasonic desktop viscosity meter (FCV-100H manufactured by Fuji Ultrasonic Engineering Co., Ltd.), the viscosity is 10 mPa·s. The zirconia support applied with the seed crystals and the obtained starting material solution are put in a Teflon (registered trademark) container and heated at 100° C. for 10 hours to perform hydrothermal synthesis, to thereby form an RHO-type zeolite membrane on the support. After that, the support and the zeolite membrane are washed with water and dried by a dryer at 50° C. for one night, to thereby obtain a zeolite membrane complex.

(Example 2) Example 2 is the same as Example 1 except that the composition of the starting material solution is changed to 10 $SiO_2$:1$Al_2O_3$:100$Na_2O$:10$Cs_2O$:2000$H_2O$. The viscosity of the starting material solution (at 20° C.) is 5 mPa·s.

(Example 3) Example 3 is the same as Example 1 except that the composition of the starting material solution is changed to 10 $SiO_2$:1$Al_2O_3$:10$Na_2O$:10$Cs_2O$:2000$H_2O$. The viscosity of the starting material solution (at 20° C.) is 20 mPa·s.

(Example 4) Example 4 is the same as Example 1 except that the composition of the starting material solution is changed to 20 $SiO_2$:1$Al_2O_3$:40$Na_2O$:10$Cs_2O$:2000$H_2O$. The viscosity of the starting material solution (at 20° C.) is 12 mPa·s.

(Example 5) Example 5 is the same as Example 1 except that the composition of the starting material solution is changed to 10 $SiO_2$:1$Al_2O_3$:40$Na_2O$:10$Cs_2O$:5000$H_2O$. The viscosity of the starting material solution (at 20° C.) is 7 mPa·s.

(Example 6) Example 6 is the same as Example 1 except that the composition of the starting material solution is changed to 20 $SiO_2$:1$Al_2O_3$:10$Na_2O$:1$Cs_2O$:1000$H_2O$ and the synthesis temperature in the hydrothermal synthesis is changed to 110° C. The viscosity of the starting material solution (at 20° C.) is 30 mPa·s.

(Example 7) Example 7 is the same as Example 1 except that the support is changed to a monolith-like alumina porous support having a diameter of 30 mm and a length of 160 mm. The viscosity of the starting material solution (at 20° C.) is 10 mPa·s.

(Comparative Example 1) The same zirconia support as that in Example 1 is used and application of the seed crystals is performed in the same manner as in Example 1. The composition of the starting material solution is changed to 10.8 $SiO_2$:1$Al_2O_3$:3$Na_2O$:0.4$Cs_2O$:110$H_2O$. The support is heated at 110° C. for 144 hours to perform hydrothermal synthesis, to thereby obtain an RHO-type zeolite membrane. The viscosity of the starting material solution (at 20° C.) is 1200 mPa·s.

(Comparative Example 2) In the same manner as Comparative Example 1 except that the condition of the hydrothermal synthesis is changed to being heated at 110° C. for 24 hours, a zeolite membrane is formed.

(Measurement and Evaluation of Zeolite Membrane Complex) Various measurements are performed on the zeolite membrane complex in each of Examples 1 to 7 and Comparative Examples 1 and 2. First, a measurement using the X-ray diffraction method (XRD measurement) is performed on the surface of the zeolite membrane. In the XRD measurement, an X-ray diffraction apparatus manufactured by Rigaku Corporation (apparatus name: MiniFlex 600) is used. The XRD measurement is performed with the condition that the tube voltage is 40 kV, the tube current is 15 mA, and the scanning speed is 0.5°/min, and the scanning step is 0.02°. Further, other conditions are that the divergence slit is 1.25°, the scattering slit is 1.25°, the receiving slit is 0.3 mm, the incident solar slit is 5.0°, and the light-receiving solar slit is 5.0°. No monochromator is used, and as a CuKβ ray filter, used is a nickel foil having a thickness of 0.015 mm. In the zeolite membrane complex in each of Examples 1 to 7, in the XRD pattern, the peak intensity in the vicinity of 2θ=18.7° is not higher than 0.4 times the peak intensity in the vicinity of 2θ=8.3°, and the peak intensity in the vicinity of 2θ=14.4° is not higher than 0.3 times the peak intensity in the vicinity of 2θ=8.3°. In other words, the peak intensity derived from the (310) plane of the RHO-type zeolite is not higher than 0.4 times the peak intensity derived from the (110) plane thereof and the peak intensity derived from the (211) plane is not higher than 0.3 times the peak intensity derived from the (110) plane. Further, FIG. 3 described earlier is a graph showing the XRD pattern obtained from the zeolite membrane complex in Example 1.

In contrast to this, in the zeolite membrane complex in each of Comparative Examples 1 and 2, in the XRD pattern, the peak intensity in the vicinity of 2θ=18.7° is higher than 0.4 times the peak intensity in the vicinity of 2θ=8.3°, and the peak intensity in the vicinity of 2θ=14.4° is higher than 0.3 times the peak intensity in the vicinity of 2θ=8.3°. In other words, the peak intensity derived from the (310) plane of the RHO-type zeolite is higher than 0.4 times the peak intensity derived from the (110) plane thereof and the peak intensity derived from the (211) plane is higher than 0.3 times the peak intensity derived from the (110) plane.

Further, the molar ratio (Si/Al ratio) of silicon/aluminum of the zeolite membrane is measured by the EDS analysis. In the EDS analysis, the accelerating voltage is not higher than 10 kV. As shown in Table 2, in the zeolite membrane complex in each of Examples 1 to 7 and Comparative Examples 1 and 2, the molar ratio of silicon/aluminum is in a range from 1 to 10.

TABLE 2

| | RHO Membrane | | | Evaluation | |
|---|---|---|---|---|---|
| | Si/Al Ratio | Thickness of Zeolite Membrane (μm) | Thickness of Composite Layer (μm) | Separation Factor | Water Permeance ($kg/m^2h$) |
| Example 1 | 1.5 | 3 | <1 | >1500 | 1.6 |
| Example 2 | 1.2 | 2.5 | <1 | >1500 | 2.0 |
| Example 3 | 1.4 | 3.1 | <1 | >1500 | 1.5 |
| Example 4 | 2.0 | 3 | <1 | >1500 | 1.5 |
| Example 5 | 1.2 | 2 | <1 | >1500 | 2.2 |
| Example 6 | 3.0 | 3 | <1 | >1500 | 1.3 |
| Example 7 | 1.3 | 2 | <1 | >1500 | 1.9 |
| Comparative Example 1 | 2.2 | 2 | 4 | 800 | 0.8 |
| Comparative Example 2 | 1.8 | 0.5 | 3 | 3.5 | 1.8 |

Further, on each zeolite membrane complex, measurement of the respective thicknesses of the zeolite membrane and the composite layer is performed. In the measurement of the thickness, as described with reference to FIG. 2, the cross section of the zeolite membrane complex perpendicular to the formation surface of the zeolite membrane on the support is exposed, and a SEM image of the cross section is acquired by using the scanning electron microscope (SEM). The magnification of the SEM image is 5000 times. Subsequently, in the vicinity of one measurement position in a direction along the formation surface in the SEM image, the boundary positions on both sides of the composite layer in the depth direction are specified. Then, a distance in the depth direction between the boundary position in the composite layer on the side of the zeolite membrane and the boundary position on the opposite side of the zeolite membrane is acquired as the thickness of the composite layer at the measurement position. Further, a distance in the depth direction between the position of the surface of the zeolite membrane and the boundary position of the composite layer on the side of the zeolite membrane is acquired as the thickness of the zeolite membrane at the measurement position.

On each zeolite membrane complex, an average value of the thicknesses of the composite layer at different ten measurement positions is obtained and determined as the thickness of the composite layer in the zeolite membrane complex. Similarly, an average value of the thicknesses of the zeolite membrane at ten measurement positions is obtained and determined as the thickness of the zeolite membrane in the zeolite membrane complex. In Table 2, the thickness of the zeolite membrane and that of the composite layer are also shown.

In each of Examples 1 to 7, the thickness of the composite layer is smaller than that of the zeolite membrane, while in each of Comparative Examples 1 and 2, the thickness of the composite layer is larger than that of the zeolite membrane. Further, in each zeolite membrane complex, the thickness of the zeolite membrane is not larger than 5 μm. On the other hand, in each of Examples 1 to 7, the thickness of the composite layer is smaller than 1 μm, while in each of Comparative Examples 1 and 2, the thickness of the composite layer is significantly larger than 1

In the evaluation of the zeolite membrane complex, the separation factor and the water permeance are measured. In the above-described separation apparatus 2, the mixed liquid of water and ethanol is suppled from the supply part 26 to the zeolite membrane complex 1 inside the housing 22, and the separation factor and the water permeance are obtained from the permeate substance (i.e., permeate liquid) which permeates the zeolite membrane complex 1 and is collected by the second collecting part 28. Specifically, the separation factor is a value (i.e., a separation ratio of water and ethanol) obtained by dividing the water concentration (mass %) in the permeate substance collected by the second collecting part 28 by the ethanol concentration (mass %) in the permeate substance collected by the second collecting part 28. The water permeance is obtained from the amount of water in the permeate substance collected by the second collecting part 28. Further, the temperature of the mixed liquid supplied from the supply part 26 is 60° C., the ratio of water and ethanol in the mixed liquid is each 50 mass %, and the permeate pressure (the degree of vacuum on the permeate side) is 50 Torr.

As shown in Table 2, in the zeolite membrane complex in each of Comparative Examples 1 and 2, the separation factor is not more than 800. In contrast to this, in the zeolite membrane complex in each of Examples 1 to 7, the separation factor is more than 1500, and the RHO-type zeolite membrane having high denseness is obtained. Further, in each of Examples 1 to 7, the water permeance (water flux) is not lower than 1.3 $kg/m^2$ h and high water permeance is achieved.

As described above, in the starting material solution in each of Examples 1 to 7, the viscosity is sufficiently low and the fluidity is increased, as compared with the starting material solution in each of Comparative Examples 1 and 2. It can be thought that it thereby becomes possible to form a dense zeolite membrane. Further, in the zeolite membrane complex in each of Examples 1 to 7, the thickness of the composite layer becomes smaller, as compared with the zeolite membrane complex in each of Comparative Examples 1 and 2. This is because the starting material solution in each of Examples 1 to 7 acts preferentially to the seed crystals. Specifically, it is thought that at a portion of the support with no seed crystal (for example, inside the pores), zeolite is hard to be synthesized. On the other hand, in the starting material solution in each of Comparative Examples 1 and 2, the concentration is high and zeolite is easy to be synthesized even inside the pores where no seed crystal is present. Further, in Comparative Example 2, since the separation factor is extremely low, it is thought that a coarse zeolite membrane with many clearances is formed and the water permeance becomes relatively high, and in Comparative Example 1, since the thickness of the composite layer is large, it is thought that the water permeance becomes low.

As described above, the zeolite membrane complex 1 includes a porous support 11 and a zeolite membrane 12 provided on the support 11 and composed of RHO-type zeolite. In a case where the surface of the zeolite membrane 12 is measured by the X-ray diffraction method, the peak intensity derived from the (310) plane of RHO-type zeolite is not higher than 0.4 times the peak intensity derived from the (110) plane thereof and the peak intensity derived from the (211) plane is not higher than 0.3 times the peak intensity derived from the (110) plane. Thus, in the zeolite membrane complex 1, the zeolite membrane 12 is an orientation film in which the peak intensity derived from the (110) plane is high, and the openings of many pores are positioned on the surface of the zeolite membrane 12. As a result, it is possible to easily provide the zeolite membrane complex 1 having high separation factor and high permeance.

In the preferable zeolite membrane complex 1, a composite layer 13 is provided in the support 11, with part of the zeolite membrane 12 entering pores, and the thickness of the composite layer 13 is smaller than that of the zeolite membrane 12 on the support 11. It is thereby possible to suppress permeation of the high permeability substance from being inhibited in the composite layer 13 and increase the permeance of the high permeability substance. More preferably, the thickness of the zeolite membrane 12 is not higher than 5 μm and the thickness of the composite layer 13 is not higher than 1 μm. In such a zeolite membrane complex 1, it is possible to further increase the permeance of the high permeability substance.

Preferably, the molar ratio of silicon/aluminum in the zeolite membrane 12 is 1 to 10. It is thereby possible to increase the hydrophilic property of the zeolite membrane 12 and further increase the separation factor and the permeance of the zeolite membrane complex 1 in the case where water is a high permeability substance. In other words, the zeolite membrane 12 can be suitably used as a dehydration membrane.

The method of producing a zeolite membrane complex 1 includes a step of depositing the seed crystals composed of RHO-type zeolite, onto the porous support 11 and a step of forming the zeolite membrane 12 on the support 11 by immersing the support 11 in the starting material solution and performing hydrothermal synthesis to grow RHO-type zeolite from the seed crystals. Further, in the starting material solution, the molar ratio of silicon/aluminum is 2 to 20, the molar ratio of sodium/aluminum is 10 to 100, the molar ratio of cesium/aluminum is 0.5 to 10, and the molar ratio of water/aluminum is 500 to 5000. It is thereby possible to easily provide the zeolite membrane complex 1 having high separation factor and high permeance.

Further, since the viscosity of the starting material solution at 20° C. is 1 to 150 mPa·s, it is possible to more reliably produce the zeolite membrane complex 1 having high separation performance and high permeance.

In order to increase the denseness of the zeolite membrane, it can be thought that the hydrothermal synthesis should be repeated a plurality of times, but in this case, the respective thicknesses of the zeolite membrane and the composite layer become larger and the permeance becomes lower. In contrast to this, in the method of producing the zeolite membrane complex 1, by adjusting the starting material solution as described above, it is possible to form the dense zeolite membrane 12 while the respective thicknesses of the zeolite membrane 12 and the composite layer 13 are made smaller.

In the above-described zeolite membrane complex 1 and the above-described method of producing the zeolite membrane complex 1, various modifications can be made.

In the zeolite membrane complex 1, when some degree of permeance is ensured, the thickness of the composite layer 13 may be not smaller than that of the zeolite membrane 12 on the support 11. Further, the thickness of the zeolite membrane 12 may be larger than 5 μm, and the thickness of the composite layer 13 may be larger than 1 μm.

In the zeolite membrane 12, the molar ratio of silicon/aluminum may be higher than 10.

In the support 11 having the through holes, the zeolite membrane 12 may be provided on either one of the inner peripheral surface and the outer peripheral surface thereof or both of the inner peripheral surface and the outer peripheral surface.

When the zeolite membrane complex 1 can be appropriately produced, the viscosity of the starting material solution, used for formation of the zeolite membrane 12, at 20° C. may be out of the range from 1 to 150 mPa·s. Further, the zeolite membrane complex 1 may be produced by any method other than the above-described production method.

The zeolite membrane complex 1 may further include a function layer or a protective layer laminated on the zeolite membrane 12, additionally to the support 11 and the zeolite membrane 12. Such a function layer or a protective layer may be an inorganic membrane such as a zeolite membrane, a silica membrane, a carbon membrane, or the like or an organic membrane such as a polyimide membrane, a silicone membrane, or the like. Further, a substance that is easy to adsorb water may be added to the function layer or the protective layer laminated on the zeolite membrane 12.

In the separation apparatus 2 and the separation method, the separation of the mixed substance may be performed by a vapor permeation method, a reverse osmosis method, a gas permeation method, or the like other than the pervaporation method exemplarily shown in the above description.

In the separation apparatus 2 and the separation method, any substance other than the substances exemplarily shown in the above description may be separated from the mixed substance.

The configurations in the above-described preferred embodiment and variations may be combined as appropriate only if those do not conflict with one another.

While the invention has been shown and described in detail, the foregoing description is in all aspects illustrative and not restrictive. It is therefore understood that numerous modifications and variations can be devised without departing from the scope of the invention.

INDUSTRIAL APPLICABILITY

The zeolite membrane complex of the present invention can be used, for example, as a dehydration membrane, and can be further used in various fields in which zeolite is used as a separation membrane for any of various substances other than water, an adsorption membrane for any of various substances, or the like.

REFERENCE SIGNS LIST

1 Zeolite membrane complex
11 Support
12 Zeolite membrane
13 Composite layer
S11 to S13, S21, S22 Step

The invention claimed is:

1. A zeolite membrane complex, comprising:
a porous support; and
a zeolite membrane provided on said support and composed of RHO-type zeolite,
wherein in a case where a surface of said zeolite membrane is measured by an X-ray diffraction method, a peak intensity derived from a (310) plane of RHO-type zeolite is not higher than 0.4 times a peak intensity derived from a (110) plane thereof and a peak intensity derived from a (211) plane thereof is not higher than 0.3 times the peak intensity derived from the (110) plane.

2. The zeolite membrane complex according to claim 1, wherein
a composite layer is provided in said support, with part of said zeolite membrane entering pores, and
a thickness of said composite layer is smaller than that of said zeolite membrane on said support.

3. The zeolite membrane complex according to claim 2, wherein
the thickness of said zeolite membrane is not larger than 5 μm and the thickness of said composite layer is not larger than 1 μm.

4. The zeolite membrane complex according to claim 1, wherein in said zeolite membrane, a molar ratio of silicon/aluminum is 1 to 10.

5. A method of producing the zeolite membrane complex according to claim 1, comprising:
a) depositing seed crystals composed of RHO-type zeolite, onto a porous support; and
b) forming a zeolite membrane on said support by immersing said support in a starting material solution and performing hydrothermal synthesis to grow RHO-type zeolite from said seed crystals,
wherein in said starting material solution, a molar ratio of silicon/aluminum is 2 to 20, a molar ratio of sodium/aluminum is 10 to 100, a molar ratio of cesium/aluminum is 0.5 to 10, and a molar ratio of water/aluminum is 500 to 5000.

6. The method of producing a zeolite membrane complex according to claim 5, wherein
a viscosity of said starting material solution at 20° C. is 1 to 150 mPa·s.

* * * * *